United States Patent
Kim (10) Patent No.: US 10,432,485 B2
(45) Date of Patent: Oct. 1, 2019

(54) METHOD AND APPARATUS FOR PROCESSING DATA

(71) Applicant: SAMSUNG ELECTRONICS CO., LTD., Suwon-si, Gyeonggi-Do (KR)

(72) Inventor: Chang-moo Kim, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 55 days.

(21) Appl. No.: 15/635,699

(22) Filed: Jun. 28, 2017

(65) Prior Publication Data

US 2018/0176109 A1     Jun. 21, 2018

(30) Foreign Application Priority Data

Dec. 15, 2016 (KR) .................. 10-2016-0171664

(51) Int. Cl.
    *H04L 12/26* (2006.01)
(52) U.S. Cl.
    CPC ............ *H04L 43/08* (2013.01); *H04L 43/028* (2013.01)
(58) Field of Classification Search
    CPC ............................. H04L 43/08; H04L 43/028
    See application file for complete search history.

(56) References Cited

U.S. PATENT DOCUMENTS

| 6,778,423 | B2 | 8/2004 | Kang |
| 6,909,743 | B1 | 6/2005 | Ward et al. |
| 9,252,802 | B2 | 2/2016 | Hollis |
| 2008/0126569 | A1* | 5/2008 | Rhim ................. G06F 15/7825 709/250 |
| 2013/0293546 | A1* | 11/2013 | Lee ........................ G06T 1/20 345/426 |
| 2014/0050082 | A1* | 2/2014 | Sun ....................... H04L 47/38 370/230 |

FOREIGN PATENT DOCUMENTS

| JP | 4216582 | 1/2009 |
| KR | 10-0259092 | 3/2000 |
| KR | 10-2004-0003953 | 1/2004 |
| KR | 10-0482995 | 4/2005 |
| KR | 10-2005-0076136 | 7/2005 |
| KR | 10-0946177 | 3/2010 |

* cited by examiner

*Primary Examiner* — Mohammad S Anwar
(74) *Attorney, Agent, or Firm* — F. Chau & Associates, LLC (57) ABSTRACT

A processing device and a method of processing data between a plurality of modules in the processing device. The method includes monitoring packets exchanged between a transmission module and a reception module from among the plurality of modules; determining whether a task being executed by the processing device has switched based on the monitored packets; when the task being executed by the processing device has switched, obtaining a packet layout encoded by taking into account transitions to occur due to processing of data packets regarding the switched task; and executing the switched task by using data packets to which the obtained packet layout is applied.

18 Claims, 9 Drawing Sheets

Drawcall 0 — 900

| | | | | |
|---|---|---|---|---|
| Packet a | 1A | 1B | 1C | 1D |
| Packet b | 2A | 2B | 2C | 2D |
| Packet c | 3A | 3B | 3C | 3D |

Drawcall 1 — 950

| | | | | |
|---|---|---|---|---|
| Packet a' | 1B | 1A | 1D | 1C |
| Packet b' | 2B | 2D | 2C | 2A |
| Packet c' | 3B | 3D | 3A | 3C |

METHOD AND APPARATUS FOR PROCESSING DATA

CROSS-REFERENCE TO RELATED APPLICATION

This application claims the benefit of priority from Korean Patent Application No. 10-2016-0171664, filed on Dec. 15, 2016, in the Korean Intellectual Property Office, the disclosure of which is incorporated by reference herein.

TECHNICAL FIELD

The present disclosure relates to a processing unit (e.g. processing device) and a method of processing data between a plurality of modules in the processing device.

DISCUSSION OF THE RELATED ART

A system-on-chip (SOC) is an integrated system of various modules, such as a processor, a hardware accelerator, and a memory, that utilizes an on-chip communication medium for transmitting and receiving data between the modules. A network-on-chip (NOC) system is a technology through which a distributed data transfer is enabled between modules by arranging routers that relay data transmissions inside a chip.

In a network-on-chip system, one module concurrently exchanges data with a plurality of other modules, and thus the order in which data is to be received by the one module may be unpredictable. Therefore, the application of a bus encoding technique, in which the number of transitions between bits is reduced by comparing previous data with next data, presents challenges to be implemented on a network-on-chip system. Thus, a method of reducing power consumption by reducing the number of transitions between bits that occur due to processing of data packets in a network-on-chip system has been the focus of research.

SUMMARY

Provided are a processing device and a method of processing data between a plurality of modules in the processing device.

According to an embodiment of the inventive concept, a method of processing data between a plurality of modules in a processing device includes monitoring packets exchanged between a transmission module and a reception module from among the plurality of modules; determining whether a task being executed by the processing device has switched based on the monitored packets; when the task being executed by the processing device has switched, obtaining a packet layout encoded based on determining transitions of data bits to occur due to processing of data packets regarding the switched task; and executing the switched task by using data packets to which the obtained packet layout is applied.

The transmission module and the reception module may exchange packets via a network-on-chip system.

The determining whether the task being executed has switched is based on an increase in monitored packets being processed by the transmission module or the reception module, or by a change in characteristics of data bits included in the monitored packets.

The processing device may determine whether the task being executed has switched from a first application to a second application.

The processing device may determine whether the task being executed has switched from a first task to a second task of the same application.

According to an embodiment of the inventive concept, there is provided a non-transitory computer-readable recording medium having recorded thereon one or more computer programs for implementing the method.

According to an embodiment of the inventive concept, a processing device includes a plurality of modules configured to operate as transmission modules or reception modules; and a control circuit. The control circuit is configured to monitor packets exchanged between a transmission module and a reception module from among the plurality of modules; determine, based on the monitored packets, whether a task being executed by the processing device has switched; when the task being executed by the processing device has switched, obtain a packet layout encoded based on a determination of transitions to occur due to processing of data packets regarding the switched task; and execute the switched task by using data packets to which the obtained packet layout is applied.

According to an embodiment of the inventive concept, the tasks executable by the processing device are categorized into groups according to preset criteria, and the plurality of packet layouts defined in advance are defined in advance in correspondence to the respective groups.

According to an embodiment of the inventive concept, the task being executed by the processing device may correspond to an application or a subtask associated with execution of an application.

According to an embodiment of the inventive concept, the control module is configured to determine that the task being executed by the processing device has switched when a probability that a value of data bits at a preset position from among data bits included in the monitored packets is 1 exceeds a preset probability.

According to an embodiment of the inventive concept, the task being executed by the processing device is a drawcall corresponding to an object being processed by graphics pipelines.

According to an embodiment of the inventive concept, a processing device may include a plurality of modules corresponding to Intellectual Property (IP) modules of a network-on-chip system, the plurality of modules being reconfigurable to operate as transmission modules or reception modules based on execution of a task; a plurality of routers that control transmission and reception of data between respective modules of the plurality of modules; and a control circuit that is configured to monitor packets exchanged between a particular transmission module and a particular reception module from among the plurality of modules; determine, based on the monitored packets, whether a task being executed by the processing device has switched, and obtain a packet layout encoded based on determined transitions to occur due to processing of data packets for the switched task, and control execution the switched task by utilizing data packets to which the obtained packet layout is applied.

The control circuit may include a plurality of logic gates.

The control circuit may include one or more processors.

The control circuit may determine whether the task being executed has switched based on detecting an increase in monitored packets being processed by the particular transmission module or the particular reception module, or by detecting a change in characteristics of data bits included in the monitored packets.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments of the inventive concept, examples of which are illustrated in the accompanying drawings, wherein like reference numerals refer to like elements throughout. In this regard, the present embodiments may have different forms and the inventive concept should not be construed as being limited to the descriptions set forth herein. Accordingly, the embodiments are described below, by referring to the figures, for illustrative purposes. As used herein, the term "and/or" includes any and all combinations of one or more of the associated listed items.

It is to be understood by a person of ordinary skill in the art that the following description is provided to illustrate the embodiments and does not limit the scope of the inventive concept. As used herein, the terms "comprises" or "includes" should not be construed as necessarily including the various elements or steps described in the specification, and some of the elements or some steps may not be included or the terms may be interpreted to include additional components or steps.

It is also to be noted that, as used herein, terms including ordinal such as "first" or "second" can be used to describe various components, but the components should not be limited by the terms. The terms are used only for the purpose of distinguishing one component from another. Also, the terms "unit" and "module" in the specification refer to structure configured to execute at least one function or operation, which may be implemented in hardware or a combination of hardware and software.

Embodiments below relate to an apparatus and a method of processing data between a plurality of modules in a processor, processing device and technical features well known to one of ordinary skill in the art may not be described in detail.

Figure 1:
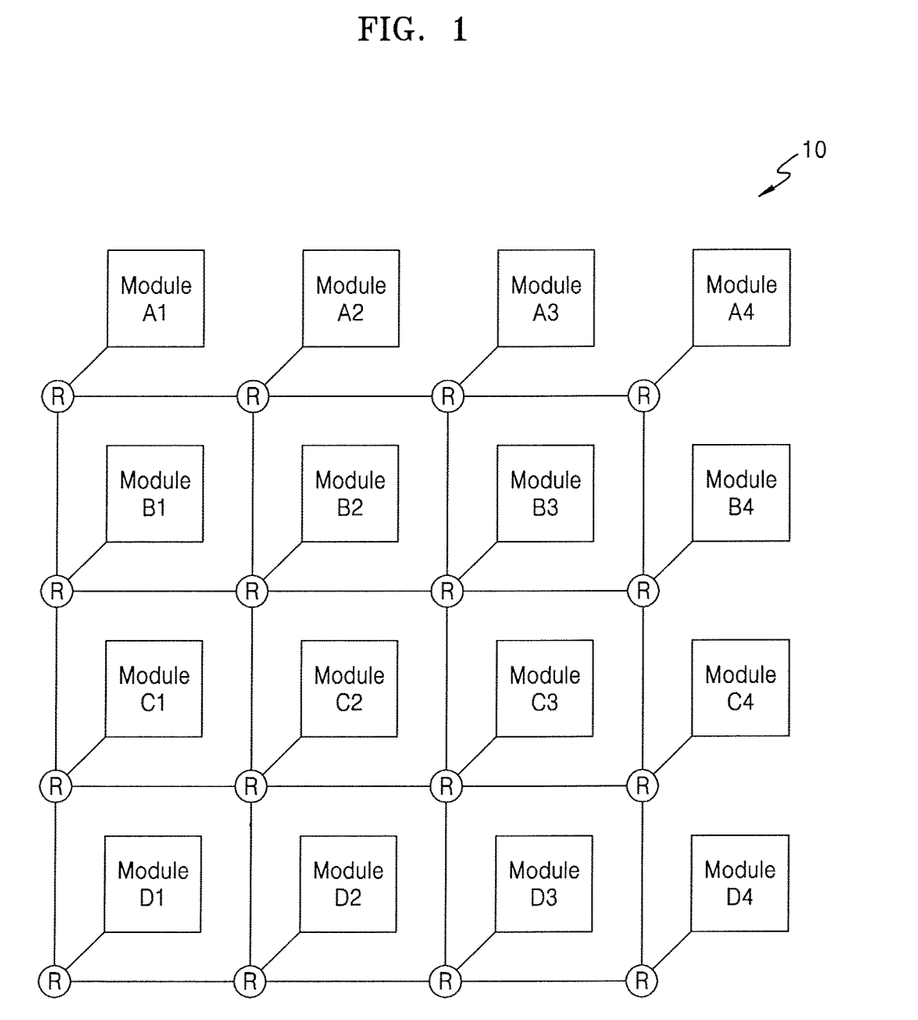
FIG. 1 is a diagram illustrating an example of a network-on-chip system according to an embodiment of the inventive concept.

FIG. 1 is a diagram showing an example of a network-on-chip system according to an embodiment of the inventive concept.

Referring to FIG. 1, a network-on-chip system 10 may include a plurality of modules and a plurality of routers. For example, as shown in FIG. 1, the network-on-chip system 10 may include a total of sixteen modules including modules A1, A2, A3, A4, modules B1, B2, B3, B4, modules C1, C2, C3, C4, and modules D1, D2, D3, D4, and sixteen routers. The configuration denoted by R in FIG. 1 may be a router. The structure of the network-on-chip system 10 of FIG. 1 is an example provided for illustrative purposes, and any structure of a system using a network-on-chip may be applied to the embodiments of the inventive concept.

The network-on-chip system 10 is a communication system that connects hardware components in a processing device to exchange data between the hardware components. In other words, a network-on-chip may be implemented by using a technology for processing data by networking between a plurality of intellectual property (IP) modules in a chip via routers.

Each of the modules shown in FIG. 1 may be hardware that transmits or receives data using a network-on-chip. Each of the modules may be an IP module of the network-on-chip system 10. For example, each of the modules may be a processor, a hardware accelerator, a memory, a scheduler, etc. Each of the modules may also be a unit (e.g. a portion) of a processor, a unit of a memory, etc.

Each of the modules may become a transmission module or a reception module, depending on a situation. For example, each of the modules may operate as a transmission module in a case of transmitting data and may operate as a reception module in a case of receiving data.

The routers (denoted by R in FIG. 1) may be hardware that controls transmission/reception of data between modules in the network-on-chip system 10. For example, when the module A1 transmits a data packet to the module C3, the routers may forward the data packet from the module A1 to the module C3 based on destination information recorded in the data packet.

As shown in FIG. 1, since the plurality of modules are included in the network-on-chip system 10 and data is simultaneously exchanged between the plurality of modules, it may be difficult to predict a sequence of data to be received by arbitrary reception modules. For example, it may be assumed that, when the module A1 transmits data to the module C3, the module A2 also transmits data to the module C3. A sequence in which the module C3 receives the data transmitted by the module A1 and the data transmitted by the module A2 may vary depending on a situation.

Since it is difficult to predict an order of data to be processed in the network-on-chip system 10, according to the inventive concept a statistical method may be used to reduce the number of transitions to occur as data packets are processed. A "transition", as used herein, may refer to a change of the state of a digital signal from logic 1 to 0 or vice versa. Hereinafter, embodiments of the inventive concept that may reduce power consumption of a processing device by reducing the number of transitions to occur as data packets are processed will be described.

Figure 2:
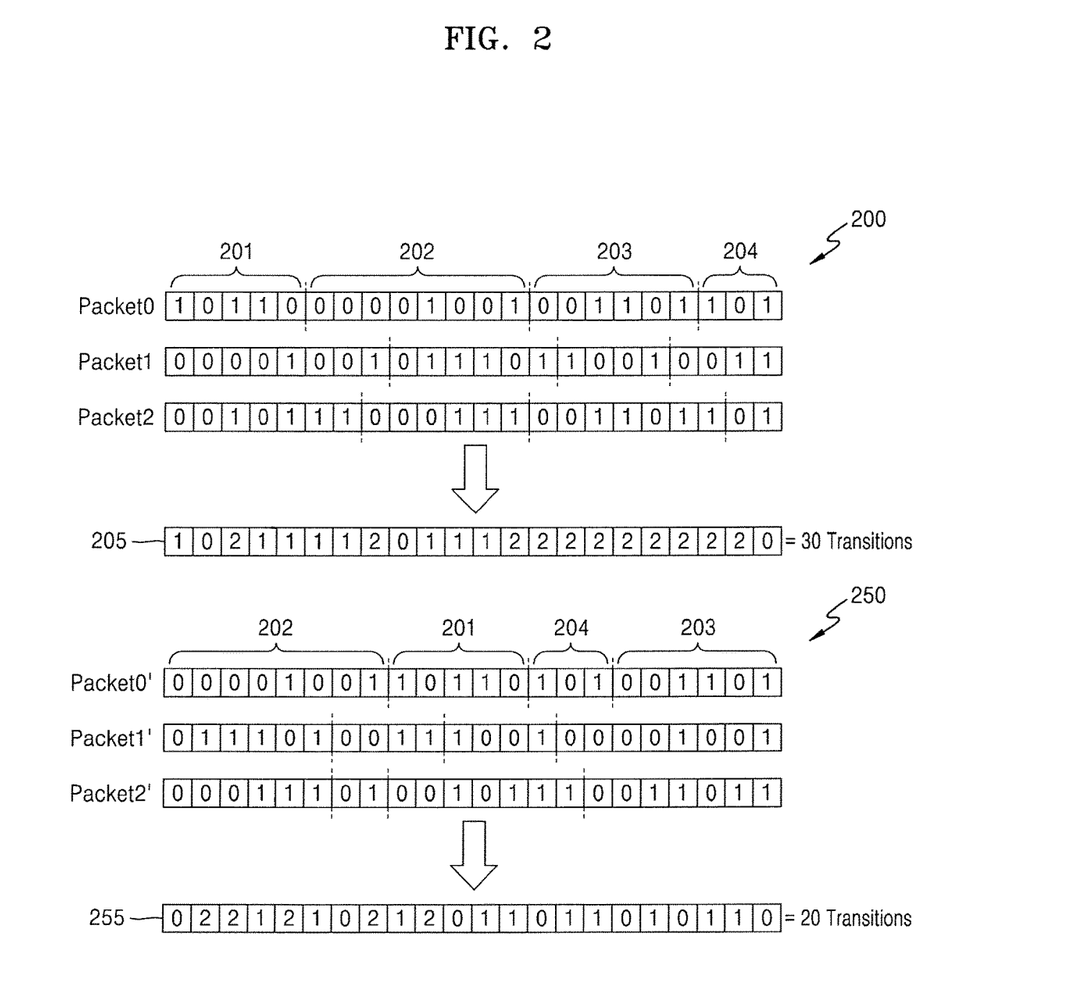
FIG. 2 is a diagram illustrating changes in the number of transitions to occur by processing packets according to packet encoding, according to an embodiment of the inventive concept.

FIG. 2 is a diagram illustrating changes in the number of transitions to occur when packets are processed according to packet encoding, according to an example embodiment of the inventive concept.

Referring to FIG. 2, packets Packet 0, Packet 1, and Packet 2 having applied thereto a packet layout 200 and packets Packet 0', Packet 1', and Packet 2' having applied thereto a packet layout 250 are shown.

A packet layout (packet layout) may refer to an arrangement of data bits included in a packet. The packet layout may be determined according to a packet definition. For example, the Packet 0 from among the packets having applied thereto the packet layout 200 may be defined, such that, for example, data 201 indicating destination information, data 202 indicating control information, data 203 indicating packet configuration information, and data 204 indicating module characteristic information are arranged in this stated order.

Meanwhile, data bits included in a packet may be transmitted in parallel via a plurality of channels. For example, 22 data bits 1011000001001001101101 included in the Packet 0 may be transmitted in parallel via 22 channels.

Furthermore, data bits of the same location in different packets may be transmitted via a same channel. For example, as shown in FIG. 2, when the Packet 1 is transmitted after the Packet 0, the first bit of the Packet 1, which is 0, may be transmitted via the same channel as the first bit of the Packet 0, which is 1.

Therefore, as data bits included in different packets are transmitted through respective channels, transitions may occur at respective locations (e.g. positions) of data bits. For example, when Packet 1 is transmitted after Packet 0, the first bit of Packet 1, which is 0, is transmitted after the first bit of the Packet, which is 1, is transmitted, and thus a transition from 1 to 0 occurs.

A table 205 (shown in FIG. 2) shows the number of transitions to occur at all positions of data bits when packets are transmitted in the order of the Packet 0, the Packet 1, and the Packet 2, and a total number of transitions of the table is also shown. For example, regarding positions of the first bits of the Packet 0, the Packet 1, and the Packet 2, data bits are transmitted, for example, in an order of 1, 0, and 0, and thus one transition from 1 to 0 occurs. Regarding locations of the third bits of the Packet 0, the Packet 1, and the Packet 2, data bits are transmitted in an order of 1, 0, and 1, and thus two transitions, including a transition from 1 to 0 and a transition from 0 to 1, occur.

Referring to the table 205, as packets to which the packet layout 200 is applied are transmitted, a total of 30 transitions including 1 transition at a location of the first bit, 0 transitions at a location of the second bit, 2 transitions at a location of the third bit, etc. may occur.

On the other hand, as a packet layout applied to packets is changed, the number of transitions to occur due to processing of packets may be changed. A packet layout to be applied to packets may be changed via packet encoding or packet redefinition. For example, the packet encoding or the packet redefinition may be a process for changing arrangements of data bits included in packets without changing sizes of the packets.

With continued reference to FIG. 2, packets to which the packet layout 250 is applied may correspond to those in which the packets to which the packet layout 200 is applied are encoded according to preset criteria. For example, unlike the Packet 0, the Packet 0' from among the packets to which packet layout 250 is applied may be encoded, such that data bits thereof are arranged in the order of data bits 202 indicating control information, data bits 201 indicating destination information, data bits 204 indicating module characteristic information, and data bits 203 indicating packet configuration information. Thus, the order of the groups of data bits in packet layout 250 is changed as compared with packet layout 200. The result of changing the order of the groups of data bits is that fewer transitions occur in the packet layout 250.

A table 255 indicates the numbers of transitions to occur at all locations (e.g. positions) of data bits when packets are transmitted in the order of the Packet 0', the Packet 1', and the Packet 2'. As shown in the table 255, when the packets to which the packet layout 250 is applied are transmitted, a total of 20 transitions including 0 transitions at a location of the first bit, 2 transitions at a location of the second bit, 2 transitions at a location of the third bit, etc. may occur.

As the packet layout 200 is changed to the packet layout 250, the total number of transitions to occur due to processing of packets may be reduced from 30 transitions to 20 transitions. The power consumption generated by processing data may be greater when a transition occurs than in a case in which data bits maintain their values of 1 or 0. Therefore, power consumption of the processor may be reduced by reducing the number of transitions to occur due to processing of data packets.

Figure 3:
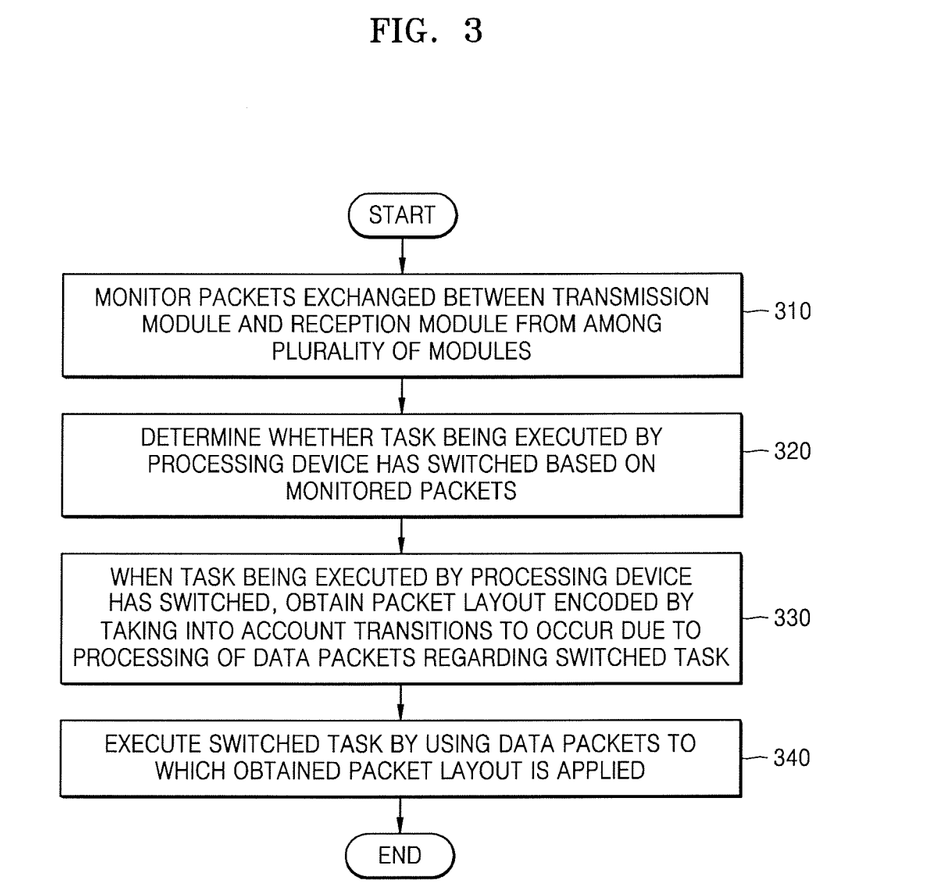
FIG. 3 is a flowchart of a method of processing data between a plurality of modules in a processing device according to an embodiment of the inventive concept.

FIG. 3 is a flowchart illustrating a method of processing data between a plurality of modules in a processing device, according to an embodiment of the inventive concept.

Referring to FIG. 3, in operation 310, the processing device may monitor packets exchanged between a transmission module and a reception module from among a plurality of modules. From among the plurality of modules, a module for transmitting data may be a transmission module, whereas a module for receiving data may be a reception module. The plurality of modules may exchange packets, thereby processing data and performing operations used for executing an application.

The processing device may monitor packets exchanged between a transmission module and a reception module. For example, the processing device may monitor packets transmitted by one or more transmission modules. The processing device may also monitor packets received by one or more reception modules. When a particular task is executed by the processing device, the number of data packets processed by a particular transmission module or a particular reception module may rapidly increase. In this case, the processing device may monitor packets processed by the particular transmission module or the particular reception module. In a network-on-chip system, the respective modules may be considered transmission modules or reception modules depending on a particular execution (e.g. situational). Thus, it is within the inventive concept that when a task is switched, a transmission module may become a reception module for the different task, or vice versa.

In operation 320, the processing device may determine whether a task being executed by the processing device has been switched based on monitored packets.

The determining as to whether a task has been switched is discussed in detail herein below.

The task being executed by the processing device may correspond to an application. For example, the processing device may determine whether the task undergoing execution by the processing device has been switched from a game application to an office application. There may be a switch from a first game application to a second game application.

Furthermore, the switching of a task is not limited to switching from one application to another application.

According to the inventive concept, a task being executed by the processing device may correspond to a subtask associated with execution of an application. For example, when the processing device is executing an office application, the processing device may determine whether a task has been switched from a task of inputting a character to a task of inserting a figure. Thus, the application may be the same application when the task is switched to another task or subtask.

When the processing device is a graphic processing unit (GPU), a task being performed by the GPU may be a drawcall corresponding to an object being processed by graphics pipelines. A drawcall may refer to a request to render an object. A central processing unit (CPU) may transmit a drawcall to the GPU to request rendering of a particular object. The GPU may determine when a drawcall has been switched based on monitored packets.

In addition, the processing device may determine whether a task being executed by the processing device has switched based on a change in characteristics of data bits included in monitored packets. For example, when the probability that the value of a data bit at a preset location from among data bits included in monitored packets is 1 exceeds a preset probability, the processing device may determine that a task being executed by the processing device has switched. The preset probability may vary depending on the particular application. For example, an office application may have a different preset probability than a game application. In addition, different game applications may have each respective preset probability.

Data bit(s) at preset location(s) may vary depending on operating environments of the processing device. For example, the data bit(s) at the preset location(s) may be the top five bits (e.g. first five) of a data packet or may be the most significant bit of the data packet. The preset location may be a location corresponding to data bits whose characteristics change abruptly when a task being executed by the processing device has switched. The preset location may be determined experimentally or may be determined based on a user input.

With regard to the value of a data bit exceeding a preset probability, a person of ordinary skill in the art should appreciate that the preset probability may be a threshold value for judging whether a task being executed by the processing device has switched. For example, the processing device may determine that a task being executed by the processing device has switched from a game application to an office application when the probability that the value of the most significant bit included in monitored packets is 1 exceeds 90%. The preset probability may be determined experimentally and may be determined based on a user input. Thus, the value of 90% discussed above is provided for explanatory purposes.

Furthermore, when the probability that the value of a data bit at a preset location from among data bits included in monitored packets is 0 exceeds a preset probability, the processing device may determine that a task being executed has switched. For example, the processing device may determine that a task being executed by the processing device has switched from an office application to a game application when the probability that the value of the most significant bit included in monitored packets is 0 exceeds 90%.

When an application has switched, characteristics of packets exchanged between the plurality of modules in the processing device may change, and thus the processing device may determine whether a task being executed by the processing device has switched by monitoring packets. An increase in the activity of packets associated with a particular application is one the processor may determine that a task has been switched.

Referring back to the flowchart of FIG. 3, in operation 330, when a task being executed by the processing device has switched, the processing device may obtain a packet layout encoded based on consideration of the transitions to occur due to the processing of data packets for a switched task. The obtained packet layout may be determined so that transitions between data bits of the same positions included in different packets, to which the obtained packet layout is applied, are minimized during the execution of the switched task.

The processing device may select a packet layout corresponding to a switched task from among a plurality of preset packet layouts. The plurality of preset packet layouts may be preset by taking into account (e.g. considering) transitions to occur due to the processing of data packets for respective tasks that may be executed by the processing device.

For example, a packet layout "A" may be defined in advance by taking into account transitions to occur due to processing of data packets regarding a game application. The processing device may obtain the packet layout A as it is determined that a task being executed by the processing device has switched to a game application. The packet layout A may be preset to minimize transitions between data bits included in packets processed during execution of the game application.

Tasks that may be executed by the processing device may be categorized into groups according to preset criteria. The plurality of preset packet layouts may be defined in advance in correspondence to the respective divided groups. For example, there may be multiple game applications in which game applications 1 through 4 may be categorized into a group 1, whereas game applications 5 through 8 may be categorized into a group 2. The packet layout A may be defined in advance so as to correspond to applications of the group 1, whereas a packet layout "B" may be defined in advance so as to correspond to applications of the group 2. Applications included in each group may be applications having similar characteristics of packets exchanged between a plurality of modules when the applications are executed by the processing device.

Referring back to the flowchart of FIG. 3, in operation 340, the processing device may execute the switched task using the data packets to which the obtained packet layout is applied. The processing device may change the packet layout of the data packets corresponding to the switched task to the packet layout obtained in operation 330.

In view of the above operations, a person of ordinary skill in the art should appreciate that the obtained packet layout is determined so that transitions between data bits of the same location included in different packets, to which the obtained packet layout is applied, are minimized during execution of the switched task. Accordingly, the processing device may reduce transitions to occur due to processing of data regarding the switched task.

Moreover, the processing device may select a packet layout optimized for a switched task, thereby reducing the number of transitions to occur due to processing of data packets and reducing power consumption.

Figure 4:
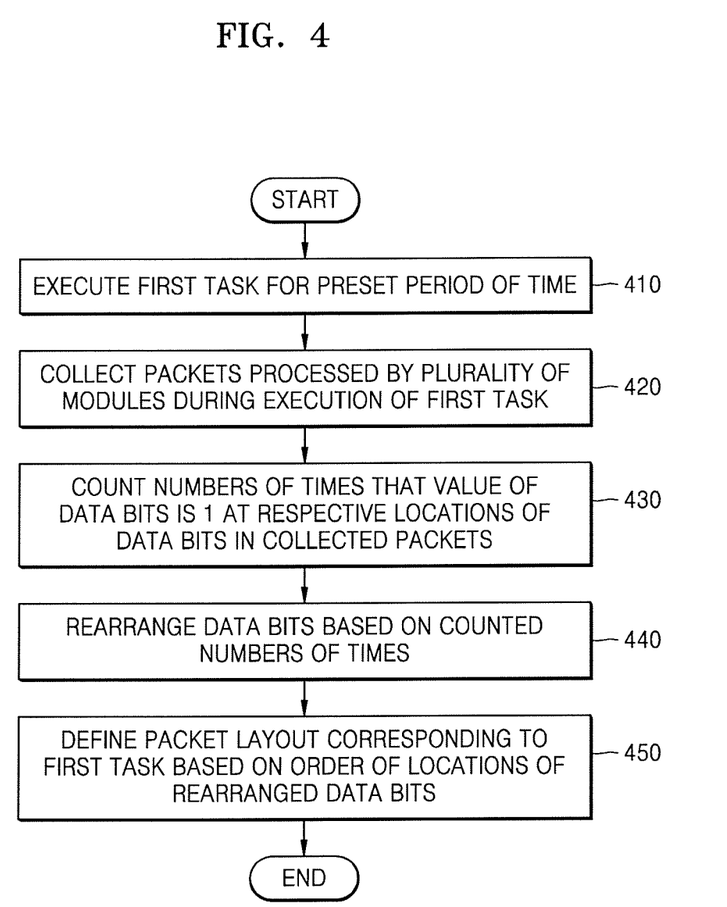
FIG. 4 is a flowchart illustrating a method of defining a packet layout optimized for a particular task, according to an embodiment of the inventive concept.

FIG. 4 is a flowchart of a method of defining a packet layout optimized for a particular task, according to an embodiment of the inventive concept.

Referring to FIG. 4, in operation 410, the processing device may execute a first task for a preset period of time.

The first task may refer to any task to which an optimized packet layout may be applied. The first task may correspond to an arbitrary application, or may correspond to an arbitrary subtask associated with execution of an application.

In operation 420, the processing device may collect packets processed by a plurality of modules while the first task is being executed. The packets processed by the plurality of modules may include packets transmitted by one or more transmission modules from among the plurality of modules (e.g. as shown in FIG. 1) and/or packets received by one or more reception modules from among the plurality of modules.

The processing device may collect packets for the preset period of time during which the first task is executed. For example, the processing device may execute the first task and collect packets for 10 seconds. The processing device may collect packets for a period of time sufficient to define an optimized packet layout. A person of ordinary skill in the art should appreciate that the aforementioned preset period of time was provided for explanatory purposes and the appended claims are not limited by this explanation.

In operation 430, the processing device may count the number of times that the value of a data bit is 1 at respective positions of data bits in the collected packets. For example, the processing device may count the number of times that the value of data bits is 1 at a first location in the collected packets and count the number of times that the value of data bits is 1 at some or all of the remaining positions. Meanwhile, the processing device may also count the numbers of times that the value of data bits is 0 at respective positions of the data bits in the collected packets.

In operation 440, the processing device may rearrange the data bits based on the counted numbers of times in operation 430. The processing device may rearrange the data bits in ascending or descending order according to the counted numbers of times. For example, it may be assumed in this example that the processing device collects 10 packets containing 3 data bits each, the number of times that the value of data bits is 1 at a first location is 7, the number of times that the value of data bits is 1 at a second location is 9, and the number of times that the value of data bits is 1 at a third location is 8. The processing device may rearrange the data bits in the order of the data bits at the second location, the data bits at the third location, and the data bits at the first location.

In addition, the processing device may calculate the probability that the value of data bits is 1 at each location of data bits based on the counted numbers of times and rearrange the data bits based on the calculated probability. In the foregoing example, since the number of times that the value of data bits is 1 at the first location is 7 out of 10, the probability that the value of data bits is 1 at the first location may be calculated as 70%. In the same regard, the probability that the value of data bits is 1 at the second location may be calculated as 90%, and the probability that the value of data bits is 1 at the third location may be calculated as 80%. The processing device may rearrange the data bits in the order of the data bits at the second location, the data bits at the third location, and the data bits at the first location based on the calculated probability.

With continued reference to FIG. 4, in operation 450, the processing device may define a packet layout corresponding to the first task based on the order of positions of the rearranged data bits. The most significant bit from among the data bits included in packets to which the packet layout defined in the operation 440 is applied may be the bit most likely to have the value of 1. Furthermore, the least significant bit may be the bit least likely to have the value of 1.

Therefore, when a packet layout defined by the method of FIG. 4 is applied to all packets processed by the processing device, the value of the most significant bit from among the data bits included in all of the packets may highly likely be 1, and the number of transitions of bits occurring as the most significant bits are transmitted may be minimized. Furthermore, the value of the least significant bits may highly likely be 0, and the number of transitions occurring as the least significant bits are transmitted may also be minimized.

The processing device may determine a packet layout, such that transitions between data bits at the same positions included in different packets during execution of a particular task are minimized. Therefore, power consumption due to execution of the particular task by the processing device may be reduced by the packet layout as determined according to the inventive concept.

Moreover, the processing device that performs the method of FIG. 4 may be identical to the processing device for performing the method of FIG. 3. For example, a processing device may define a packet layout optimized for a particular task in advance and may select the preset packet layout when the processing device determines that a task executed by the processing device has switched to the particular task associated with preset packet layout.

A person of ordinary skill in the art should appreciate that there may be a plurality of preset packet layouts that may be associated with a particular task or tasks. There may also be preset packet layouts associated with tasks of respective applications.

Furthermore, the processing device for performing the method of FIG. 4 may be different than the processing device for performing the method of FIG. 3. For example, a processing device for performing the method of FIG. 4 may be an apparatus configured to perform only a task for defining a packet layout optimized for a particular task. Meanwhile, the processing device for performing the method of FIG. 3 may be an apparatus configured to perform only a task for selecting a packet layout optimized for a particular task from among the packet layouts defined in advance by a separate processing device.

Figure 5:
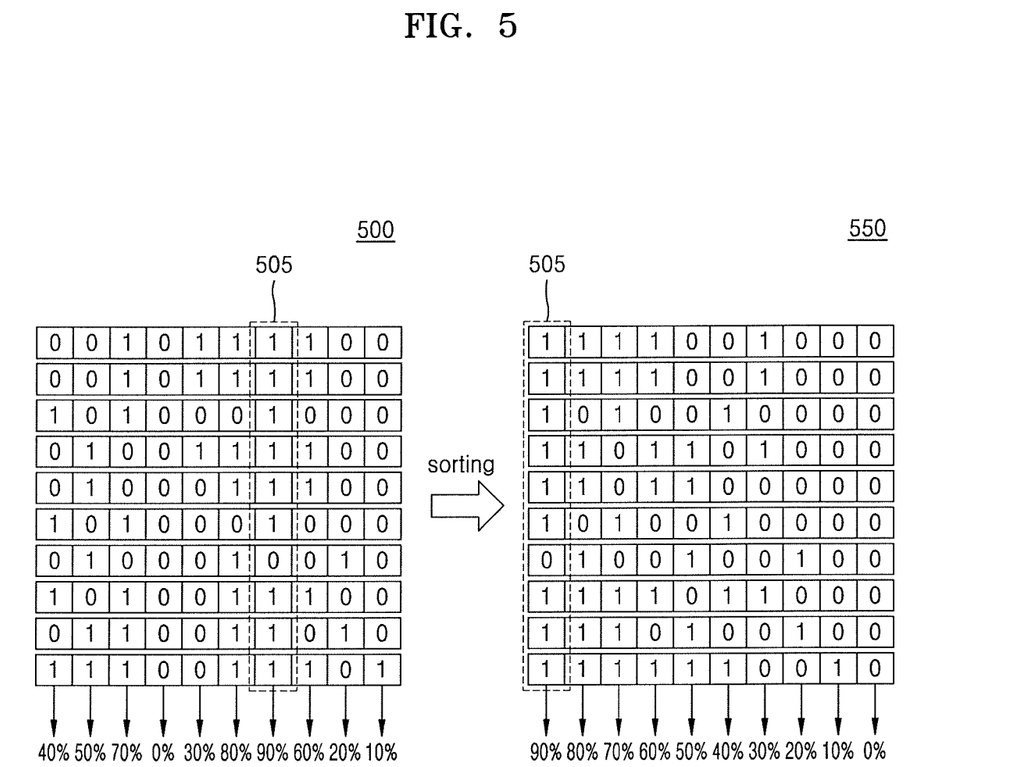
FIG. 5 is a diagram illustrating an example of packet encoding, according to an embodiment of the inventive concept.

FIG. 5 is a diagram showing an example of packet encoding, according to an embodiment of the inventive concept.

Referring to FIG. 5, an example of a process in which a processing device encodes packets using the method of FIG. 4 is shown.

The processing device may collect packets processed by a plurality of modules while a first task is being executed. For example, as shown in FIG. 5, the processing device may collect 10 packets 500 for a preset period of time. The quantity of 10 packets was chosen to facilitate explanation of the packet encoding.

As shown in FIG. 5, the number of data bits being 1 may be used as a basis to determine the probability at each of the positions. More specifically, the processing device may count the numbers of times that the value of data bits is 1 at respective positions of the data bits in the collected packets 500. For example, the processing device may count the number of times that the value of data bits is 1 at a first location as 4 and the number of times that the value of data bits is 1 at a second location as 5. Furthermore, the processing device may continue to count the numbers of times that the value of data bits is 1 at the remaining positions.

The processing device may calculate the probabilities that the value of data bits is 1 at respective positions of the data bits based on the counted numbers of times. For example, as shown in FIG. 5, the processing device may calculate the probabilities that the value of data is 1 at first to tenth positions as 40%, 50%, 70%, 0%, 30%, 80%, 90%, 60%, 20%, and 10%, respectively.

The processing device may rearrange the data bits based on the counted numbers of times. The processing device may rearrange the data bits in ascending or descending order according to the counted numbers of times. For example, as shown in FIG. 5, when the probability that the value of bits 505 at the seventh location is 1 is 90% and is the highest probability, the bits 505 at the seventh location may be rearranged to the first location. In this case, it may be considered that the processing device rearranged the data bits in packet 550 in descending order based on the counted numbers of times for each of the positions.

The processing device may define a packet layout corresponding to the first task based on the rearranged positions of the data bits. In packets 550 to which a newly defined packet layout is applied, the data bits may be rearranged in the order of the probabilities that the value of data bits is 1.

Therefore, when all packets processed by the processing device are encoded as shown in FIG. 5, the value of the most significant bits from among the data bits included in all of the packets may highly likely be 1, and the number of transitions of bits occurring as the most significant bits are transmitted may be minimized. Furthermore, the value of the least significant bits may highly likely be 0, and the number of transitions occurring as the least significant bits are transmitted may also be minimized.

Figure 6:
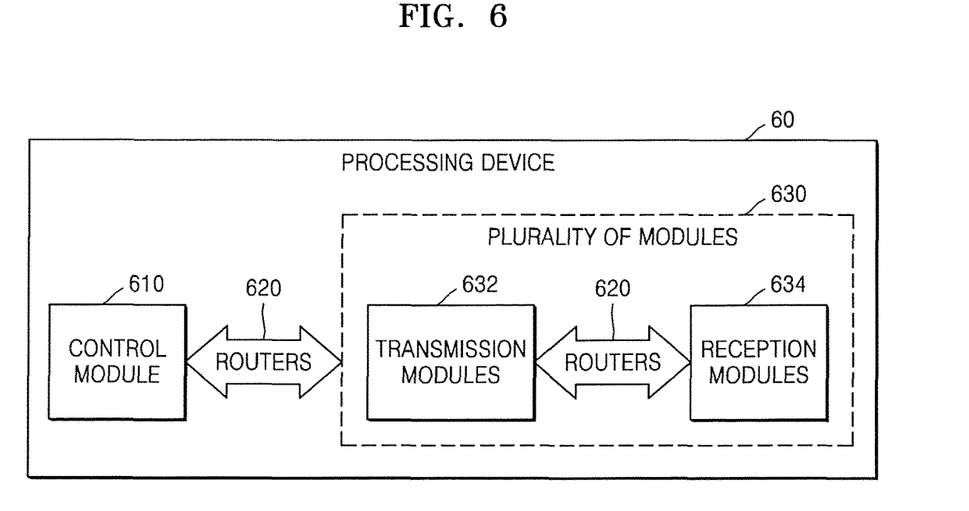
FIG. 6 is a block diagram illustrating a configuration of a processing device, according to an embodiment of the inventive concept.

FIG. 6 is a block diagram showing a configuration of a processing device, according to an embodiment of the inventive concept.

As shown in FIG. 6, a processing device 60 may include a control module 610 (control circuit), routers 620, and a plurality of modules 630. The plurality of modules 630 may include transmission modules 632 and reception modules 634 as discussed above with regard to FIG. 1, and may comprise a plurality of intellectual property (IP) modules in a chip that communicate via routers.

The plurality of modules 630 may be hardware modules that transmit or receive data using a network-on-chip. The plurality of modules 630 may correspond to IP modules of the network-on-chip system 10 (FIG. 1). For example, each of the plurality of modules 630 may correspond to a processor, a hardware accelerator, a memory, or a scheduler. Furthermore, each of the plurality of modules 630 may also indicate a processor unit or a memory unit.

The transmission modules 632 may refer to modules from among the plurality of modules 630 that are used to transmit data. Furthermore, the reception modules 634 may denote modules from among the plurality of modules 630 that are used to receive data. Each of the plurality of modules 630 may have the capability to operate as a transmission module or a reception module depending on particular situations. The routers 620 may be hardware that control transmission and reception of data between respective modules in the network-on-chip system 10 (FIG. 1).

With continued reference to FIG. 6, the control module 610 (control circuit) may include one or more processors or sub-processors. For example, a processor may include hardware such as, for example, an array of a plurality of logic gates or may include a combination of a general microprocessor and a memory in which a program that may be executed in the microprocessor is stored. Such a general microprocessor may be transformed into a special purpose microprocessor when the stored program is executed. The control module 610 (control circuit) may perform overall operations for controlling the processing device 60.

As a task being executed by the processing device 610 has switched, the control module 610 may be configured to select a packet layout optimized for the switched task. The control module 610 may monitor packets exchanged between a transmission module and a reception module. For example, the control module 610 may monitor packets transmitted by one or more transmission modules 632. Furthermore, the control module 610 may monitor packets received by one or more reception modules 634.

The control module 610 may determine whether a task being executed by the processing device 60 has switched based on the values of data bits of the monitored packets. The task being executed by the processing device 60 may correspond to an application. Furthermore, the task being executed by the processing device 60 may correspond to a subtask associated with execution of an application.

On the other hand, the control module 610 may determine whether a task being executed by the processing device 60 has switched based on a change in characteristics of data bits included in monitored packets. For example, the control module 610 may determine that a task being performed by the processing device 60 has switched when the probability of a data bit at a preset location from among the data bits included in the monitored packets exceeds a preset probability.

When a task being executed by the processing device 60 has switched, the control module 610 may obtain a packet layout encoded by taking into account transitions to occur due to processing of data packets for the switched task. The obtained packet layout may be determined so that transitions between data bits at the same positions included in different packets, to which the obtained packet layout is applied, are minimized during execution of the switched task. The same location may refer to, for example, an ordinal location (e.g. $6^{th}$ bit, $7^{th}$ bit, etc.).

The control module 610 may select a packet layout corresponding to a switched task from among a plurality of preset packet layouts. The plurality of preset packet layouts may be defined in advance in consideration of transitions between bits to occur due to processing of data packets for each of tasks that may be executed by the processing device 60.

Meanwhile, tasks that may be executed by the processing device 60 may be categorized into groups according to preset criteria. The plurality of preset packet layouts may be defined in advance so as to correspond to the divided groups, respectively.

The control module 610 may be configured to perform a switched task by using data packets to which an obtained packet layout is applied. Since the obtained packet layout is determined so that transitions between data bits at the same locations included in different packets, to which the obtained packet layout is applied, are minimized during the execution of the switched task, the control module 610 may reduce transitions to occur due to processing of data regarding the switched task.

In addition, the control module 610 may define a packet layout optimized for a particular task. The control module 610 may execute a first task for a preset period of time. The first task may correspond to an arbitrary application or may correspond to an arbitrary subtask associated with execution of an application.

The control module 610 may be configured to collect packets processed by a plurality of modules during the execution of the first task. The packets processed by the plurality of modules may include packets transmitted by one or more transmission modules of the plurality of modules and/or packets received by one or more reception modules of the plurality of modules.

The control module 610 may be configured to count the numbers of times that the value of data bits is 1 at respective locations (positions) of the data bits in the collected packets. On the other hand, the control module 610 may count the numbers of times that the value of data bits is 0 at respective positions of the data bits in the collected packets.

The control module 610 may be configured to rearrange the data bits based on the counted numbers of times. The control module 610 may rearrange the data bits in ascending or descending order according to the counted numbers of times. Meanwhile, the control module 610 may calculate the probabilities that the value of data bits is 1 at respective positions of the data bits based on the counted numbers of times and rearrange the data bits based on the calculated probabilities.

In addition, the control module 610 may define a packet layout corresponding to the first task based on the order of the positions of the rearranged data bits. The control module 610 may determine a packet layout, such that transitions between data bits at the same positions included in different packets during execution of a particular task are minimized. Therefore, power consumption due to execution of the particular task by the control module 610 may be reduced.

As described above, a control module for defining a packet layout optimized for a particular task may be included in a separate processing device different than a processing device that includes a control module for selecting a packet layout optimized for a task that has switched from a task being executed by the processing device. For example, the control module included in the separate processing device may perform only an operation for defining a packet layout optimized for a particular task. The control module included in the processing device may select a packet layout optimized for a particular task from among packet layouts defined in advance by the control module included in the separate processing device.

Figure 7:
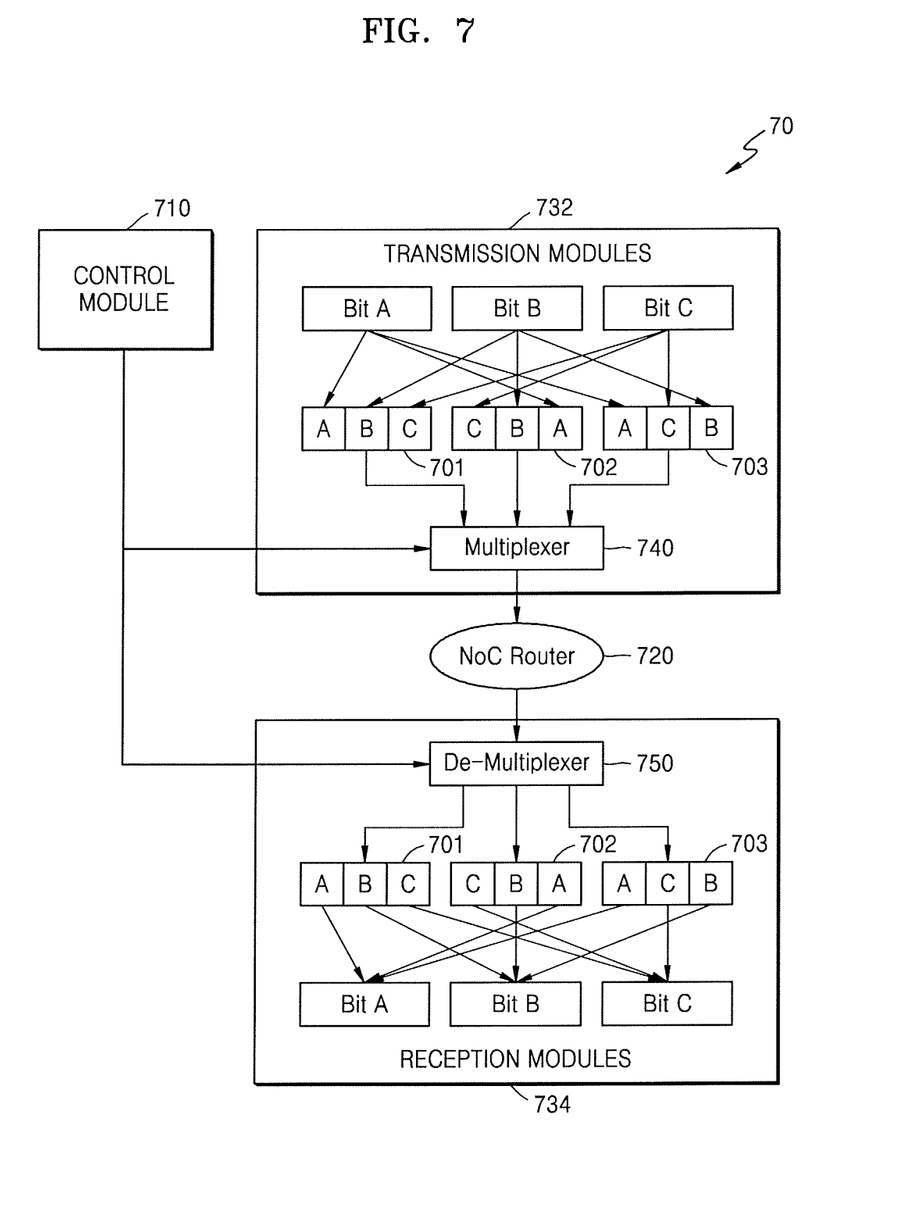
FIG. 7 is a diagram showing a configuration of a processing device, according to an embodiment of the inventive concept.

FIG. 7 is a diagram showing a configuration of a processing device, according to an embodiment of the inventive concept.

As shown in FIG. 7, the processing device 70 in this embodiment may include a control module 710 (control circuit), a router 720, a transmission module 732, and a reception module 734, and may further include a multiplexer 740 and a de-multiplexer 750.

The control module 710 (control circuit), the router 720, the transmission module 732, and the reception module 734 of FIG. 7 may respectively be the same or similar to the control module 610 (control circuit), the routers 620, the transmission modules 632, and the reception modules 634 of FIG. 6, and thus redundant descriptions thereof will be omitted.

Meanwhile, each of data packets processed by the processing device 70 of FIG. 7 may include three bits. The number of bits (3) is provided for illustrative purposes, and the size of data packets processed by the processing device 70 may include an arbitrary number of bits. The size of a data packet may be determined when hardware of the processing device 70 is designed.

Furthermore, packet layouts for data packets may be defined in advance. For example, as shown in FIG. 7, a packet layout 701 is arranged in the order of ABC, a packet layout 702 arranged in the order of CBA, and a packet layout 703 arranged in the order of ACB may be defined in advance according to orders in each of which a bit A, a bit B, and a bit C are arranged.

The multiplexer 740 may be a combining circuit that selects one input line of a plurality of input lines and connects the input line to a single output line. As shown in FIG. 7, the multiplexer 740 may, under the control of the control module 710, select one packet of the packet layout 701, the packet layout 702, and the packet layout 703. The selection of a packet layout by the multiplexer 740 may correspond to packet encoding.

For example, when the transmission module 732 attempts to transmit data bits ABC to the reception module 734, the multiplexer 740 may select the packet layout 702. Once the multiplexer 740 selects the packet layout 702, the data bits arranged in the order of CBA may be transmitted to the reception module 734 via the router 720. In other words, the multiplexer 740 receives the data bits ABC and may encode the data bits ABC into data bits CBA to be sent to the reception module 734 via the router 720.

With continued reference to FIG. 7, the de-multiplexer 750 is a separating circuit that performs a function opposite to that of the multiplexer 740 in that there can be many outputs from one input, The de-multiplexer 740 may perform a decoding function. One of a plurality of output lines may be selected and may connect the output line to an input line. As shown in FIG. 7, the de-multiplexer 750 may, under the control of the control module 710, select one of the packet layout 701, the packet layout 702, and the packet layout 703. Like in the previous example, when the reception module 734 receives data bits arranged in the order of CBA, the de-multiplexer 750 may decode the received data bits into data bits ABC by selecting the packet layout 702.

The control module 710 may control the multiplexer 740 and the de-multiplexer 750. The control module 710 may control the multiplexer 740 and the de-multiplexer 750 to select a same packet layout for respectively coding and decoding, thereby ensuring proper data exchange between the transmission module 732 and the reception module 734.

The control module 710 (control circuit) may determine whether a task being executed by the processing device 70 has switched and, when the task being executed by the processing device 70 has switched, may select a packet layout corresponding to the switched task from among a plurality of packet layouts defined in advance by using the multiplexer 740 and the de-multiplexer 750.

The processing device 70 may further include simple configurations, such as the multiplexer 740 and the de-multiplexer 750, to thereby perform an operation for selecting one of a plurality of packet layouts without significantly changing the existing hardware configuration.

Figure 8:
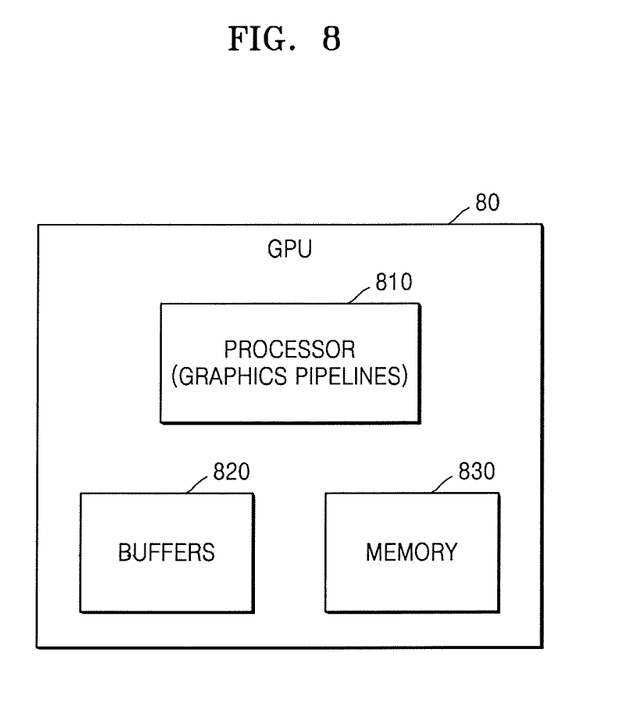
FIG. 8 is a block diagram showing a configuration of a GPU, according to an embodiment of the inventive concept.

FIG. 8 is a block diagram showing a configuration of a GPU, according to an embodiment of the inventive concept.

Referring to FIG. 8, a GPU 80 may include a processor (graphics pipelines) 810, buffers 820, and a memory 830. Furthermore, although not shown in FIG. 8, the GPU 80 may include various hardware components, including but not limited to, for example a compressor, a texture cache, a de-compressor, and a texture unit.

The GPU 80 is an apparatus that performs a graphics pipeline and may correspond to a processor dedicated for graphics. The GPU 80 may be hardware implemented to execute a three-dimensional graphics pipeline to render three-dimensional objects of a three-dimensional image into a two-dimensional image to display. For example, the GPU 80 may perform various functions, such as shading, blending, and illuminating, and various functions for generating pixel values regarding pixels to be displayed. The GPU 80 may also perform a tile-based graphics pipeline for tile-based rendering (TBR).

The buffers 820 may be hardware components (e.g. memory) that temporarily store and transfer data exchanged between hardware components within the GPU 80. The buffers 820 may compensate for differences in data transfer speeds and processing speeds between the hardware components in the GPU 80.

The memory 830 comprises hardware for storing various data to be processed in the GPU 80. For example, the memory 830 may store processed data and data to be processed by the GPU 80. The memory 830 may also store applications, drivers, etc. to be driven by the GPU 80. The memory 830 may include a random access memory (RAM), such as a dynamic random access memory (DRAM) and a static random access memory (SRAM), a read-only memory (ROM), such as a read-only memory (ROM) and an electrically erasable programmable read-only memory (EEPROM), a CD-ROM, a Blu-ray or other optical disc storage, a hard disk drive (HDD), a solid state drive (SSD), or a flash memory.

The processor 810 may control all operations that cause the GPU 80 to perform a graphics pipeline. The processor 810 may also function as a GPU driver.

In addition, the GPU 80 may correspond to the processing device 60 of FIG. 6. For example, the processor (graphics pipelines) 810 of the GPU 80 may correspond to the control module 610 (control circuit) of FIG. 6. Furthermore, the processor (graphics pipelines) 810, the buffers 820, and the memory 830 may transmit and receive data through the routers 620 and may operate as transmission modules or reception modules depending on situations. Therefore, the methods of reducing the number of transitions to occur during the processing of data described above with reference to FIGS. 1 through 7 may also be applied to the GPU 80.

The processor 810 may receive drawcalls requesting to render a particular object from a CPU. The processor 810 may monitor data packets included in the drawcalls. The processor 810 may determine whether a type of the received drawcall has changed based on the monitored packets. For example, when an object to be rendered has changed, the type of the drawcall sent to render an object may have changed.

When the type of the drawcall has switched, the processor 810 may obtain a packet layout encoded by taking into account transitions to occur due to processing of data packets regarding the changed type of drawcall. The processor 810 may select a packet layout corresponding to the changed type of the drawcalls from among a plurality of preset packet layouts.

The processor 810 may execute the changed type of drawcall by using data packets to which the obtained packet layout is applied. Since the obtained packet layout is determined so that transitions between data bits at the same positions included in different packets, to which the obtained packet layout is applied, are minimized during execution of the changed type of drawcall, the processor 810 may reduce transitions to occur due to processing of data regarding the changed type of drawcall. The reduced transitions may in turn, reduce power consumption and processing time.

In addition, the processor 810 may execute a first drawcall for a preset period of time. The processor 810 may collect packets processed by hardware components in the GPU 80 during the execution of the first drawcall. The processor 810 may count the numbers of times the value of data bits is 1 at respective positions of the data bits in the collected packets.

The processor 810 may rearrange an order of the data bits based on the counted numbers of times that 1 or a 0 occurs, or based on probability rate of an occurrence. The processor 810 may define a packet layout corresponding to the first drawcall based on the order of positions of the rearranged data bits.

Figure 9:
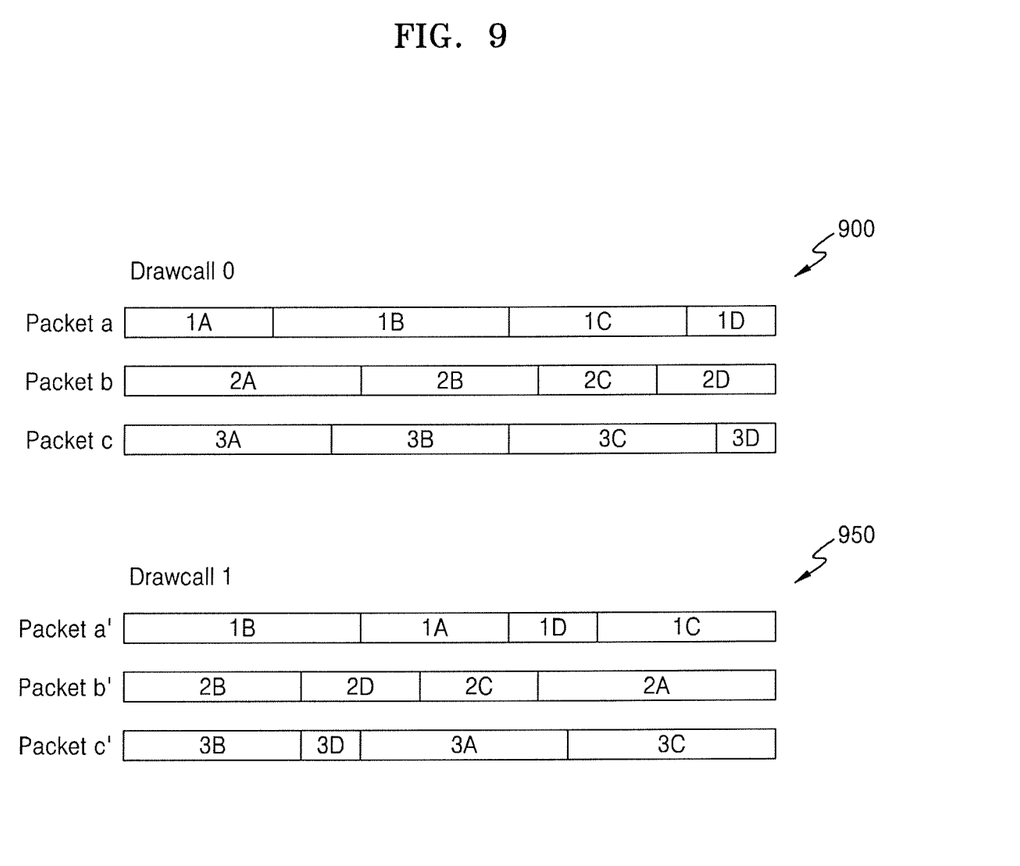
FIG. 9 is a diagram showing an example of a process for applying packet layouts optimized for respective types of drawcalls, according to an embodiment of the inventive concept.

FIG. 9 is a diagram showing an example of a process for applying packet layouts that are optimized for respective types of drawcalls, according to an embodiment of the inventive concept.

Referring to FIG. 9, there are two types of drawcalls (Drawcall 0 and Drawcall 1) shown. The Drawcall0 and the Drawcall 1 may refer to requests to render different objects.

As shown in FIG. 9, a GPU may apply a packet layout 900 to data packets to execute the Drawcall 0. As the packet layout 900 is applied, locations (e.g. positions) of data bits of Packet a, Packet b, and Packet c included in the Drawcall 0 may be determined. For example, the data bits may be arranged in the order of 1A, 1B, 1C, and 1D in the Packet a.

The packet layout 900 may be determined so that transitions between data bits of same location included in different packets, to which the packet layout 900 is applied, are minimized during execution of the Drawcall 0.

On the other hand, instead of the packet layout 900, the GPU may apply a packet layout 950 to data packets to execute the Drawcall 1. As the packet layout 950 is applied, positions of data bits of Packet a', Packet b', and Packet c' included in the Drawcall 1 may be determined. For example, the data bits may be arranged in the order of 1B, 1A, 1D, and 1C in the Packet a'.

The packet layout 950 may be determined so that transitions between data bits of a same location included in different packets are minimized, For example, the packet layout 950 is applied to minimize transitions between during execution of the Drawcall 1.

As shown in FIG. 9, the GPU may reduce the power consumption generated by processing data during execution of drawcalls by applying packet layouts that are optimized for respective drawcalls.

A person of ordinary skill in the art should understand that embodiments described herein should be considered in a descriptive sense only and not for purposes of limitation. Descriptions of features or aspects within each embodiment should typically be considered as available for other similar features or aspects in other embodiments of the inventive concept.

As used herein, the terms "units" and "modules" may refer to elements that are configured to perform at least one operation, and such units and/or modules may be implemented as hardware or a combination of hardware and software.

While one or more embodiments of the inventive concept have been described with reference to the figures, it will be understood by those of ordinary skill in the art that various changes in form and details may be made therein without departing from the spirit and scope as defined by the following claims.

What is claimed is:

1. A method of processing data between a plurality of modules in a processing device, the method comprising:
monitoring packets exchanged between a transmission module and a reception module from among the plurality of modules;

determining, based on the monitored packets, whether a task being executed by the processing device has switched;
when the task being executed by the processing device has switched, obtaining a packet layout that is encoded based on determining transitions of data bits to occur due to processing of data packets by the switched task;
changing a current packet layout of data packets corresponding to the switched task to the obtained packet layout; and
executing the switched task utilizing the data packets to which the obtained packet layout is applied,
wherein the determining comprises, when a probability that a value of data bits at a preset position from among data bits included in the monitored packets is 1 exceeds a preset probability, determining that the task being executed by the processing device has switched.

2. The method of claim 1, wherein the transmission module and the reception module exchange packets via a network-on-chip system.

3. The method of claim of claim 2, wherein the determining whether the task being executed has switched is based on an increase in monitored packets being processed by the transmission module or the reception module, or by a change in characteristics of data bits included in the monitored packets.

4. The method of claim 1, wherein the processing device determines at least one of whether the task being executed has switched from a first application to a second application and whether the task being executed has switched from a first task to a second task of the same application.

5. The method of claim 1, wherein the obtaining of the packet layout includes selecting a packet layout corresponding to the switched task from among a plurality of packet layouts defined in advance.

6. The method of claim 5, Wherein the plurality of packet layouts are defined in advance by determining transitions of bits to occur due to processing of data packets regarding respective tasks executable by the processing device.

7. The method of claim 6, wherein the tasks that are executable by the processing device are categorized into respective groups according to preset criteria, and
the plurality of packet layouts is defined in advance in correspondence to the respective groups.

8. The method of claim 1, wherein the obtaining of the packet layout is determined to minimize transitions between data bits having the same position in different packets, to which the obtained packet layout is applied, during execution of the switched task.

9. The method of claim 1, further comprising:
executing a first task for a preset period of time;
collecting packets processed by the plurality of modules during the execution of the first task;
counting a number of times that a value of data bits is 1 at respective positions of the data bits in the collected packets;
rearranging positions of the data bits based on the counted number of times; and
defining a packet layout corresponding to the first task based on an order of the rearranged positions of the data bits.

10. The method of claim 1, wherein the task being executed by the processing device is a drawcall corresponding to an object being processed by graphics pipelines.

11. A non-transitory computer readable recording medium having recorded thereon one or more computer programs for implementing the method of claim 1.

12. A processing device comprising:
a plurality of modules configured to operate as transmission modules or reception modules; and
a control circuit configured to monitor packets exchanged between a transmission module and a reception module from among the plurality of modules; determine, based on the monitored packets, whether a task being executed by the processing device has switched; when the task being executed by the processing device has switched, obtain a packet layout encoded based on a determination of data bit transitions to occur due to processing of data packets regarding the switched task; and execute the switched task by utilizing data packets to which the obtained packet layout is applied,
wherein the control circuit is configured to execute a first task for a preset period of time, collect packets processed by the plurality of modules during execution of the first task, count a number of times that a value of data bits is 1 at respective positions of the data bits in the collected packets, rearrange positions of the data bits based on the counted number of times, and define a packet layout corresponding to the first task based on an order of the rearranged positions of the data bits.

13. The processing device of claim 12, wherein the control circuit selects a packet layout corresponding to the switched task from among a plurality of packet layouts defined in advance.

14. The processing device of claim 13, wherein the plurality of packet layouts are defined in advance based on a determination of data bit transitions to occur due to processing of data packets regarding respective tasks executable by the processing device.

15. The processing device of claim 12, wherein the obtained packet layout is determined to minimize transitions between data bits having the same position in different packets, to which the obtained packet layout is applied, during execution of the switched task.

16. A processing device comprising:
a plurality of modules corresponding to Intellectual Property (IP) modules of a network-on-chip system, the plurality of modules being reconfigurable to operate as transmission modules or reception modules based on execution of a task;
a plurality of routers that control transmission and reception of data between respective modules of the plurality of modules; and
a control circuit that is configured to monitor packets exchanged between a particular transmission module and a particular reception module from among the plurality of modules; determine, based on the monitored packets, whether a task being executed by the processing device has switched, and obtain a packet layout that is encoded based on determined data bit transitions to occur due to processing of data packets for the switched task, and control execution the switched task by utilizing data packets to which the obtained packet layout is applied,
wherein the control circuit determines that the task being executed by the processing device has switched when a probability that a value of data bits at a preset position from among data bits included in the monitored packets is 1 exceeds a preset probability.

17. The processing device according to claim 16, wherein the control circuit comprises at least one of a plurality of logic gates and one or more processors.

18. The processing device according to claim 16, wherein the control circuit determines whether the task being executed has switched based on detecting an increase in monitored packets being processed by the particular transmission module or the particular reception module, or by detecting a change in characteristics of data bits included in the monitored packets.

* * * * *